United States Patent
Moscovitz et al.

(10) Patent No.: US 7,403,856 B2
(45) Date of Patent: Jul. 22, 2008

(54) METHOD AND SYSTEM FOR PROCESSING AND ANALYZING DIGITAL TERRAIN DATA

(75) Inventors: Yigal Moscovitz, Kiryat Bialik (IL); Sergey Vichic, Yokne'am (IL); Michal Attia, Shimshit (IL); Rami Ben-Ari, Or Yehuda (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 0 days.

(21) Appl. No.: 10/536,937

(22) PCT Filed: Dec. 19, 2003

(86) PCT No.: PCT/IL03/01092
§ 371 (c)(1),
(2), (4) Date: Jan. 12, 2006

(87) PCT Pub. No.: WO2004/057268
PCT Pub. Date: Jul. 8, 2004

(65) Prior Publication Data
US 2006/0184327 A1    Aug. 17, 2006

(30) Foreign Application Priority Data
Dec. 19, 2002 (IL) .......... 153535

(51) Int. Cl.
F41G 7/34 (2006.01)
(52) U.S. Cl. .......... 702/5
(58) Field of Classification Search .......... 702/5
See application file for complete search history.

(56) References Cited

U.S. PATENT DOCUMENTS

| | | | |
|---|---|---|---|
| 4,805,108 A | 2/1989 | Feuerstein et al. | |
| 5,086,396 A | 2/1992 | Waruszewski, Jr. | |
| 5,504,686 A | 4/1996 | Lippitt et al. | |
| 5,526,260 A | 6/1996 | Kodet et al. | |
| 5,838,262 A * | 11/1998 | Kershner et al. | 340/945 |

* cited by examiner

Primary Examiner—Donald E McElheny, Jr.
(74) Attorney, Agent, or Firm—Ladas and Parry LLP

(57) ABSTRACT

A method for processing and analyzing digital terrain data utilizing Digital Terrain Elevation Data (DTED). The method comprises defining approach azimuth and visibility limitations angle which are used for defining directional fans by determining fan opening angle, fan azimuth, and maximal range for terrain analysis. At least one directional fan data set is constructed from at least one source point within the DTED, where the directional fan includes line of sight information between said source point and DTED points located within said directional fan. The method further comprises interrogating said data sets by one or more queries to obtain terrain information for given approach conditions.

15 Claims, 7 Drawing Sheets

METHOD AND SYSTEM FOR PROCESSING AND ANALYZING DIGITAL TERRAIN DATA

FIELD OF THE INVENTION

The present invention relates to the fields of data processing, mission planning, mission execution, and Digital Terrain Modeling (DTMO). More particularly, the invention relates to a method and apparatus for processing and analyzing Digital Terrain Elevation Data (DTED) for mission planning and on-line re-planning.

BACKGROUND OF THE INVENTION

Digital Terrain Elevation Data (DTED) generally consists of a two-dimensional array of terrain elevation points, each of which specifies the height of a terrain point above sea level. Therefore, it constitutes a convenience terrain map for computer representation and analysis. Unlike regular topographic maps, which represent terrains by continuous contour lines of equal heights, a DTED is composed of equally distant terrain elevation points, and is analyzed and processed for construction of Digital Terrain Models (DTM) according to the specific requirements of the particular intended use.

For instance, in U.S. Pat. No. 5,086,396 a DTED in which intervals between adjacent points are of 300 ft is utilized to generate DTMs intended to help in flight navigation and mission management. The DTED is utilized to generate DTMs in which surfaces featuring potential danger (e.g., collision) to the air vehicle at its altitude, are displayed in different colors, according to the degree of threat they possess. Such DTMs can be easily generated by thresholding the DTED with respect to air vehicle altitude. However, this operation requires processing of each and every point in the DTED of interest, which can result in a costly computation time.

The computation complexity and processing time required to analyze a DTED become even more problematic when there is a need to examine the relations between the DTED points for extracting sophisticated DTMs. In U.S. Pat. No. 5,504,686 several DTMs are constructed from a DTED in which the intervals between adjacent points are typically of 800 meters. In said patent "hideability" and "flyability" DTMs are generated for mission planning. The "hidability" DTM is obtained by applying a "hidability transformation" to each and every point in the DTED. The "hidability transformation" is obtained by computing a line of sight area calculation between each point in the DTED to each and every point within an area of some radius R (on the order of thirty miles, i.e., computing a line of sight area to more than 11220 points within said radius). Similarly, the "flyability" DTM is generated by calculating a "slopeness" value to each and every point in the DTED, which is based on the heights of the eight points located in its proximity.

Because of such approach, a vast database is produced, most of which is eventually left unused and is therefore unnecessary. Other results of this approach are a large amount of memory and processing time required to carry out a specific query in such data bases.

As will be appreciated by those skilled in the art, the generation of such sophisticated DTMs involves many complex computations, and thus results in substantially long computation time which is unacceptable in real time applications. There is therefore a great need for improved DTED processing and analyzing methods, which allow faster processing and involve fewer computations in the DTM generation process.

It is an object of the present invention to provide a method and system for the fast and efficient generation of Digital Terrain Models (DTMO) utilizing a simplified and compact representation of DTED point.

It is another object of the present invention to provide a method and a system for DTMO generation, which requires a minimal set of data per point of area of interest, and which can be efficiently stored in a compressed form.

It is a further object of the present invention to provide a method and a system for mission planning by terrain analysis and study, via on line update and inquiry of DTMOs.

It is still another object of the present invention to provide a method and a system for increasing compression rate of the data required for the construction of Mission Digital Terrain Models (MDTMO) for large terrain areas.

It is still a further object of the present invention to provide a method and a system for minimizing the inquiry time that is required to obtain the information required to construct MDTMOs, and to retrieve pertinent data from MDTMOs.

It is yet another object of the present invention to provide a method and a system for the on line inquiry of mission state such as exposability of area and maps of dominance/weakness areas.

It is a further object of the present invention to provide a method and a system for the on line analysis of mission state in combination of communication ability, exposability, and mission conditions such as weather and vehicle performance envelope.

Other objects and advantages of the invention will become apparent as the description proceeds.

SUMMARY OF THE INVENTION

The present invention provides a method and a system for processing and analyzing terrain data for mission planning and re-planning. The term "mission vehicle" (e.g., air vehicle) is used herein to refer to transportation means capable of delivering the means required to carry out the mission (e.g., mission force), according to the mission assignment. The terms "vehicle performance" is meant to refer to the characteristics of the transportation means, such as velocity, physical limitations such as shell, and the like.

The term altitude is used herein to refer to the height measured relative to sea level, and the terms "exposable height" and "line of site" are used herein to refer to DTED points for which an eye contact can be established from one point to another point, and is also meant to refer to the visibility which may be achieved utilizing vision equipment, such as digital/analog cameras and other types of sensing equipment. The term "exposability conditions" refers to terrain characteristics which enable the determination of the azimuth, distance and/or altitude of approach in which a mission vehicle/force is exposed to the mission destination, and vice versa, i.e., the terrain characteristics which enable the determination of the azimuth, distance and/or altitude of approach in which the mission destination is exposed to the mission vehicle/force. The term "limitations angle" refers to the visibility restrictions which are present due to mission vehicle and/or optical equipment payload (e.g., gimbals angles).

The term mission vehicle/force state refers to the exact location, and orientation in three dimensional space, of the mission vehicle/force. The mission vehicle/force state is usually uncertain during the stages of mission planning, and is usually resolved during progressive stages, after an optimal track is determined. The term target is used here to refer to terrain ground points which are in the mission area of interest (e.g., mission destination).

The present invention is directed to a method and system for processing and analyzing digital terrain data. The terrain data is obtained in the form of a Digital Terrain Elevation Data (DTED). The general azimuth of approach of the mission vehicle/force and visibility limitations angle are used for defining directional fans, where the general azimuth of approach is preferably the azimuth from a starting point to the destination of the mission vehicle/force. The directional fans define an angular area and include data sets including the line of sight information between a source point and other DTED points within the angular area of the fan. The angular area of the directional fan is the angular area having a vertex at the fan source point and area defined by fan opening angle, fan azimuth and maximal range for terrain analysis, where the fan azimuth is preferably defined by the azimuth of the bisector of said opening angle and the maximal range for terrain analysis defines the maximal distance between the fan source point and other points within the fan's angular area.

At least one directional fan is constructed from at least one source point within the DTED, which contains the line of sight information between the source point and DTED points located within the directional fan. Optionally, the data of the directional fans may be compressed by applying a data transformation to obtain a compact data arrangement. The directional fan data may be then used to aid mission planning by means of queries for interrogating the compressed data sets to obtain terrain information for given approach conditions.

Optionally, the fan azimuth is determined according to the approach azimuth. The fan opening angle may be determined according to the visibility limitations angle. An angular resolution for each directional fan may be defined as the smallest fraction of the opening angle to be used to derive exposable heights data set(s), and may be determined according to the fan opening angle and fan maximal range.

According to one possible embodiment of the invention the fan azimuth is in the opposite azimuth (180° angle shift) to the approach azimuth. The directional fan(s) preferably includes one or more data set(s) of exposable heights, by evenly dividing the fan area into angular sections according to the fan angular resolution; constructing a data set of exposable heights for each angular section by computing for each point within the angular section the distance and elevation angle of the point relative to the fan source point; determining for each of these points if the point is in line of sight with the fan source point; and discarding the information related to the points which are not in line of sight with the fan source point, thereby obtaining in each directional fan a data set of exposable heights including the information of the DTED points, within the angular sections, that are in line of sight with the fan source point, and which are in correspondence with the azimuth of the angular section.

According to another preferred embodiment of the invention the data of a directional fan is compressed by the following steps:

a) defining a tolerable deviation for compression which defines the maximal altitude deviation of the compressed data from the original un-compressed data;

b) for each data set of exposable heights defining a line of exposable heights which is drawn between the points, of the respective angular section, that are in line of sight with the fan source point, starting with the nearest point and ending with the farthest point, in their respective sequence relative to the source point;

c) for each line of exposable heights defining a sleeve of tolerable deviation defined by the line of exposable heights and a line parallel to and above said line of exposable heights, where the distance between said lines equals the size of the tolerable deviation D;

d) for each angular section compressing the data of the line of exposable heights by performing the following steps:

d.1) drawing the longest straight line possible within the sleeve of tolerable deviation starting at the edge of the sleeve;

d.2) defining an end point on the longest line within the sleeve at the farthest section where the longest line intersects with one of the boundaries of the sleeve;

d.3) drawing the next longest line starting from the end point of the previous line; and d.4) repeating steps d.1) to d.3) until the end the sleeve is reached.

Optionally, the data compression of the line of exposable heights is performed starting from the farthest points within the angular section and proceeding toward the source point. The data of each directional fan may be represented utilizing a polar coordinate system, and the data obtained from a directional fan may be transformed from a polar representation into a Cartesian representation.

The pertinent data can be obtained from the directional fan(s) via a lookup process according to the angular displacement of the respective angular section, and the data obtained by query interrogation may further comprise interpolation of the data within an angular section, for obtaining altitude of any desired point by interpolating the points obtained from the compressed line of exposable heights.

According to another preferred embodiment of the invention the fan opening angle is set to 360°, and the interrogation of fan data set is carried out by extracting from each fan data set the lines of exposable heights which are of azimuths which falls within an opening angle directed in the opposite direction (azimuth) of that of the approach azimuth.

The interrogation of the fan data set is preferably carried out by extracting from each fan data set the lines of exposable heights which are of azimuths which falls within an opening angle directed in the opposite direction of that of the approach azimuth.

In a preferred embodiment of the invention the interrogation of the fan data set is carried out by one or more queries for detecting the minimal altitudes in which communication and/or line of sight can be established with DTED points. In particular, the queries may be utilized to determine the minimal altitude required to establish line of sight for a given distance and approach azimuth, the minimal altitude required to establish communication with a given point, and the minimal distance required to establish line of sight with terrain points for a given altitude and azimuth of approach.

The interrogation of the fan data set is carried out by one or more queries with different levels of uncertainty:

Queries of unknown azimuth of approach, utilizing a general azimuth of approach or a range of possible approach azimuths, and using the worst case results;

Queries with a known azimuth of approach or a general approach path (track), but in which the exact state is partially known or unknown; and Queries for a specific location for quickly analyzing an exact location.

DETAILED DESCRIPTION OF PREFERRED EMBODIMENTS

The present invention is directed to the generation of Mission Digital Terrain Models (MDTMO) required for mission planning, based on the generation of a particular, simplified, and compressed mission model which is created according to mission parameters and terrain information. According to a preferred embodiment of the invention the Digital Terrain Elevation Data (DTED) is utilized to extract an exposability model and a communication model, based on pre-processed directional fans of exposable vectors, which are then combined and processed into a MDTMO, which may be then efficiently used to effectively analyze terrain data with respect to mission specific parameters, in real time.

As will be explained in details hereinafter, the exposability DTMO is extracted from pre-processed directional fans of vectors of exposable heights, which are analyzed according to mission specific parameters (e.g., azimuth of approach), to reveal exposability DTMO points which satisfy the ground detection of the mission force/vehicle. The communication DTMO is also extracted from pre-processed directional fans of exposable vectors according to mission specific parameters, but for indicating DTMO height points which are capable for communication between given point(s) and the mission force/vehicle. The final MDTMO is generated utilizing the exposability and communication DTMOs, in combination with additional data concerning the mission force/vehicle performance envelope as well as other miscellaneous information which may be deemed relevant to the specific conditions (e.g., the weather).

Figure 1A:
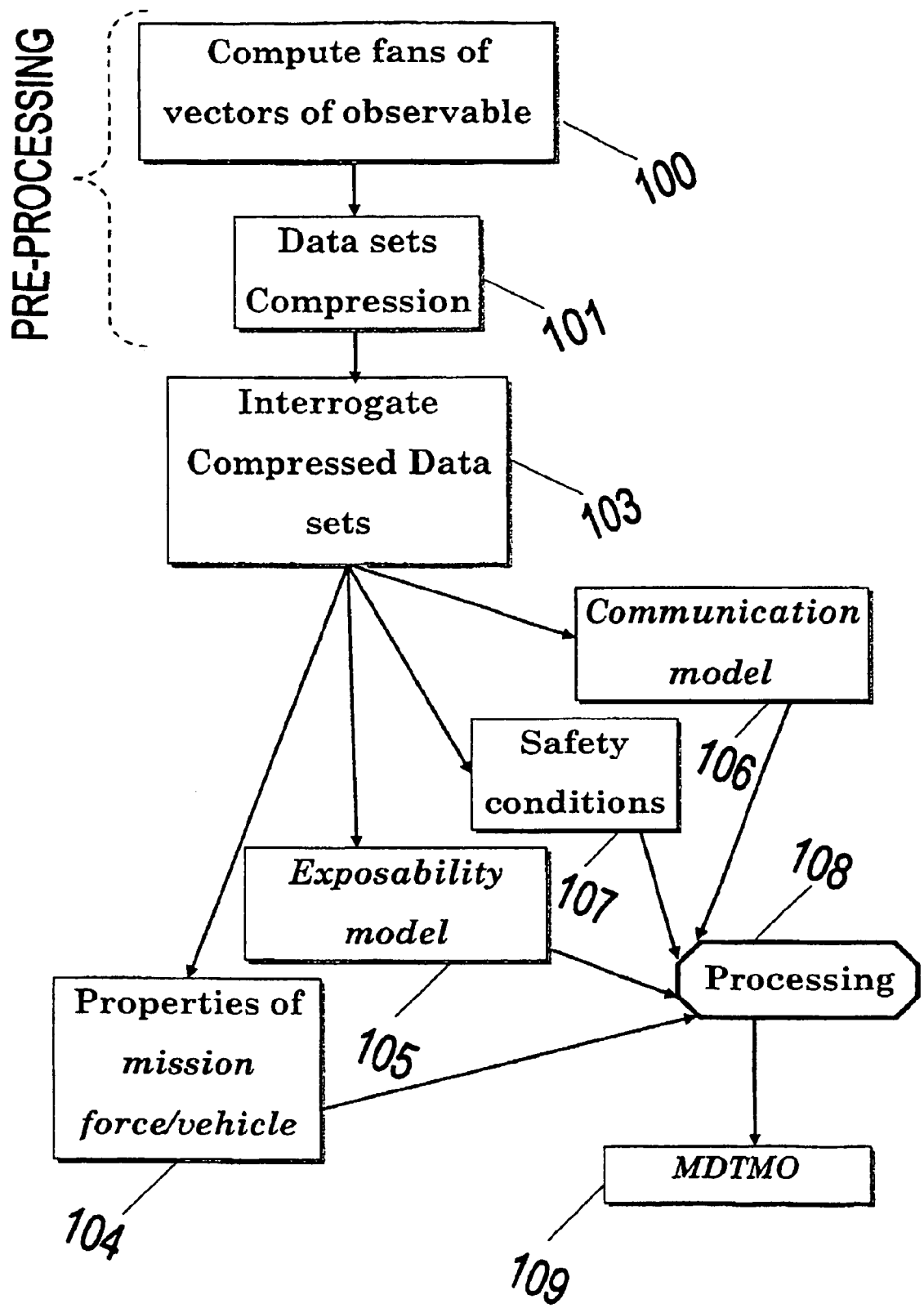
FIGS. 1A and 1B schematically illustrates a preferred process for analyzing and processing DTED.

FIG. 1A is a flow chart exemplifying a process for generating DTMOs and MDTMOs according to the method of the invention. In the first step 100 of the pre-processing stage, directional fans of vectors of exposable heights (404 in FIG. 4) are extracted from the DTED. The main purpose of this step is to determine and collect terrain information that corresponds only to those sets of points which are of interest according to some predefined conditions. In this way, only the DTED information pertaining to the mission is gathered, and all the other DTED information, which is irrelevant to the specific mission plan (e.g., azimuth of approach), is discarded. This step results in a compact and reduced data set, which is convenient for data processing according to the method of the invention. In step 101, the reduced data set that was obtained is compressed by eliminating redundant data points and by changing the data representation of the remaining data points into a compact and minimal representation, by applying a data transformation.

The compressed data sets that are obtained in step 101 are then interrogated (by queries), in step 103, according to different aspects of the mission plan. The queries performed in step 103 are utilized to generate various types of DTMOs. Some of the DTMOs which are of particular importance in the present invention are the communication DTMO (step 106), the exposability DTMO (step 105), and safety conditions (step 107). Together with the mission force/vehicle data (e.g., velocities, heights, performance capabilities, etc.) (step 104), all the above mentioned DTMOs are processed in step 108 to obtain the MDTMO in step 109, which can provide all the pertinent information required for mission execution.

Figure 2C:
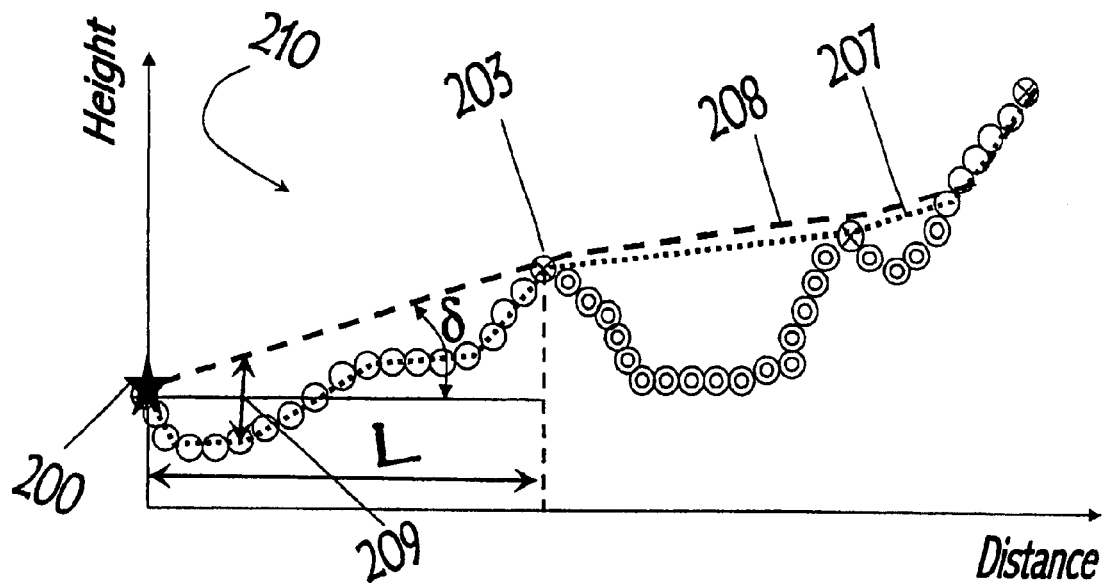
FIGS. 2B and 2C illustrates a preferred method for constructing vectors of exposable heights.
Figure 2A:
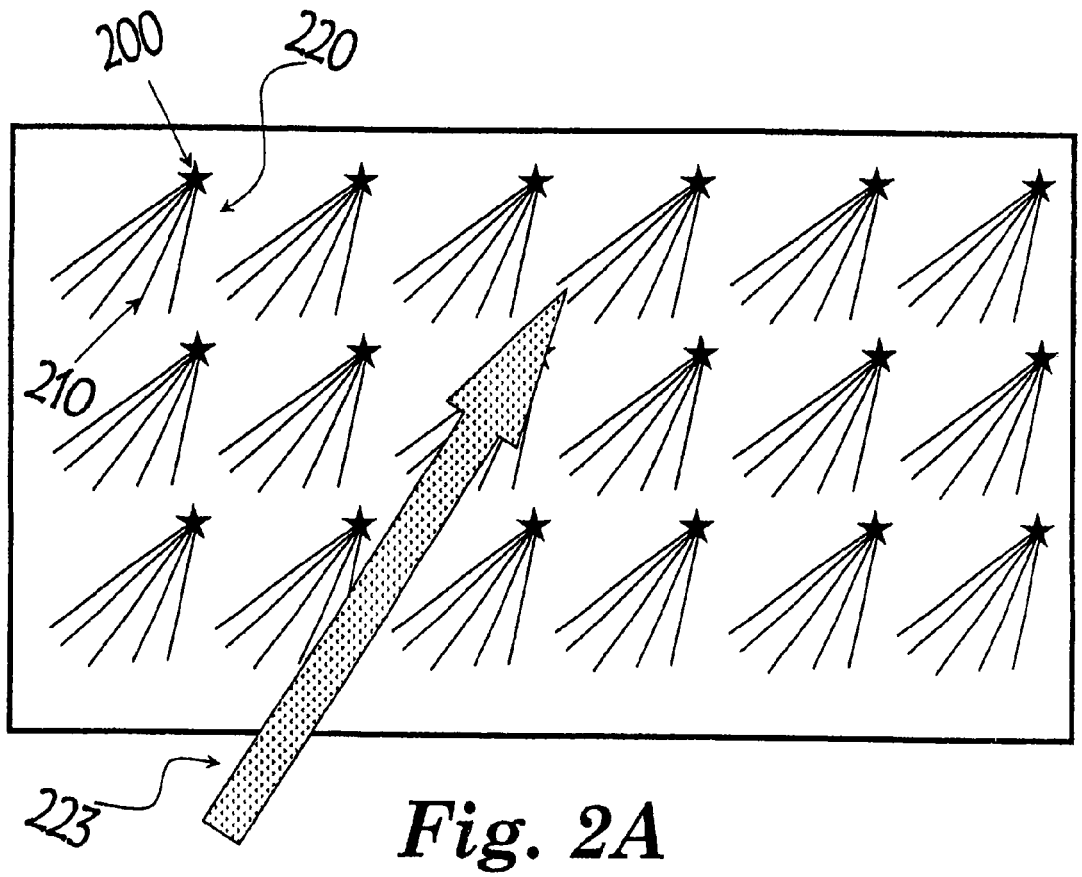
FIG. 2A illustrates the construction of exposability fans.
Figure 4:
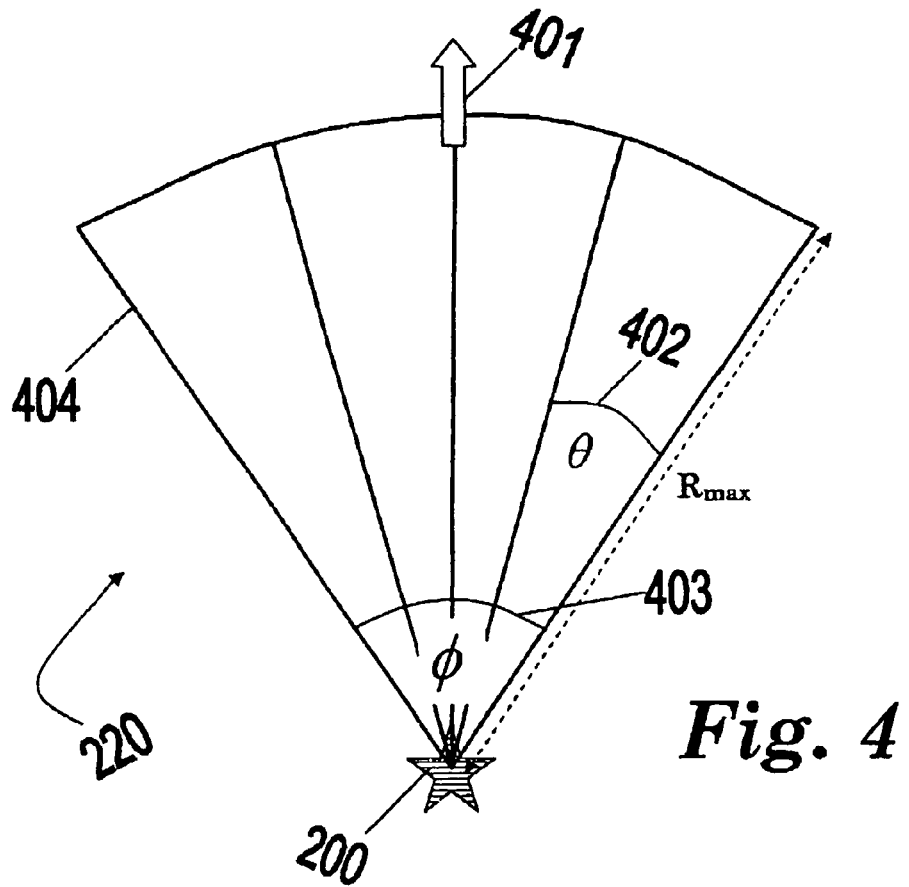
FIG. 4 demonstrates a directional fan construction.

Pre-processing:

With reference to FIG. 4, in which a directional fan is illustrated, the various DTMOs are generated utilizing two fundamental data sets, one data set comprising vectors of exposable heights (404) which are exposable by the terrain points (hereinafter source points), and the other data set comprising directional fans (220 in FIG. 5), consisting of the abovementioned vectors of exposable heights (404). The directional fans 220 are the initial data set, constructed from DTED points, which are utilized for the processing of DTED points according to the method of the invention. Each directional fan 220 is a collection of DTED information pertaining to a particular source point 200 (fan vertex). More particularly, each directional fan holds the terrain information, pertaining to the source point 200, and which is within a predefined radius $R_{max}$ and a fan opening angle $\phi$ (403). The directional fans are constructed from DTED to include terrain information in correspondence with approach azimuth 223, as shown in FIG. 2A.

As will be explained in details and illustrated hereinafter, each directional fan 220 collects the terrain line of sight information that is relevant to the mission specific conditions within a given terrain zone. This treatment substantially reduces the amount of data and processing required for producing various terrain models according to the method of the invention.

Figure 2B:
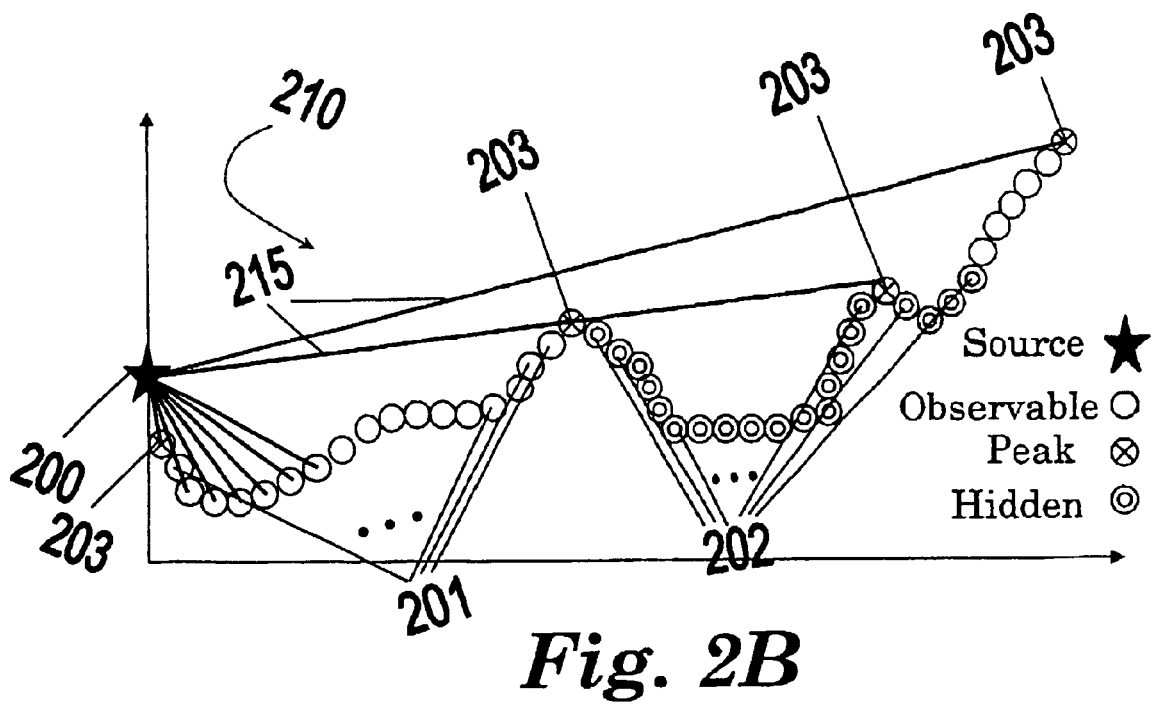

Vectors of Heights Exposable by the Targets:

These vectors (also termed herein as vectors of exposable heights 404) constitute a fundamental unit of information, which includes heights and distances indicating the minimal altitude required to be in a line of sight (i.e., eye contact) with an examined source point 200 in the DTED. The vectors 404 (FIG. 4) are computed from a two-dimensional terrain profile 210, taken from the directional fans of DTED points 220, as shown in FIGS. 2A, 2B, and 2C. Each point in a vector 404 is represented by its horizontal distance L from the source point 200 and its elevation angle $\delta$ (FIG. 2C). The vector of exposable heights 404 are constructed from the line of sight points 203, which are the DTED points within said profile which has direct line of sight 215 to the source point 200.

By the construction of vectors of exposable heights data sets 404, the selected terrain can be examined to reveal the minimal height required to maintain communication with a given ground point (e.g., control station), and the minimal height in which a given source point (e.g., Targets) may be exposed.

Figure 1B:
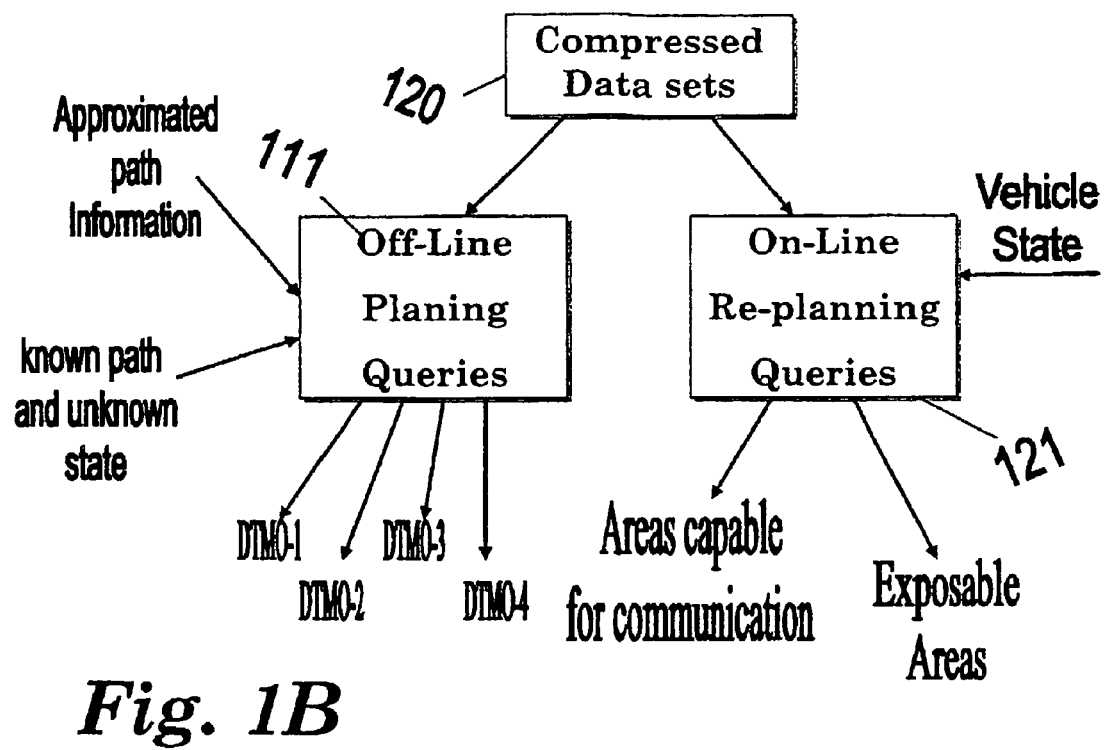

During this step (step 100 in FIG. 1) the elevation angle $\delta$ between each point in the terrain profile 210 and the source point 200 is computed (hereinafter angle of sight), and only points having an angle of sight that is greater than the angle of sight of the previous point are preserved. The outcome of this process is that Hidden points 202 are discarded, since the peak points 203 hide them, and they do not possess a direct line of sight with the source point 200. Thus, a line 207 of exposable heights is obtained, which contains only those terrain points, within the two-dimensional terrain profile 210, which are exposable by the source point 200.

In this way redundant information (related to hidden points 202) is discarded, and thus each directional fan 220 maintains only the information which is relevant according to the mission specifics (azimuth 223, $R_{max}$, φ, etc.). While this is a preferred method to discard redundant information according to the invention, it should be noted that the information included by the directional fans 220 may be compressed utilizing other methods suitable for the data processing that will be discussed hereinafter.

It should be noted that according to a preferred embodiment of the invention the operations performed during the data processing steps also involve careful examination of additional aspects which are not discussed here for the sake of brevity. For instance, for the calculation of line of sight between terrain points the earth roundness (curvature) should also be considered, and for the communication DTMOs, the communication line curvature, as well as other pertinent aspects (e.g., the weather), which should also be considered.

Data compression:

This step (101 in FIG. 1A) is carried out in order to reduce the size of the data set of exposable heights in each line of exposable heights 207. The compression step 101 determines a minimal number of points in a line of exposable heights 207, which is required to obtain a line which deviates from the prior uncompressed line of exposable heights 207 within the tolerable deviation (209) allowed for the purpose of compression (e.g. less than 50 meters above/below the line of exposable heights 207). For example, DTED points 201 (FIG. 2B) are discarded since they fall within the tolerable deviation 209. This reduction in the number of data set points also substantially reduces the time durations required for each query to examine various aspects of the selected terrain, due to the reduction in the amount of information in each directional fan 220. The compression step is performed on the lines of exposable heights 207 of each and every directional fan 220, to yield a compressed set of directional fans.

Figure 3:
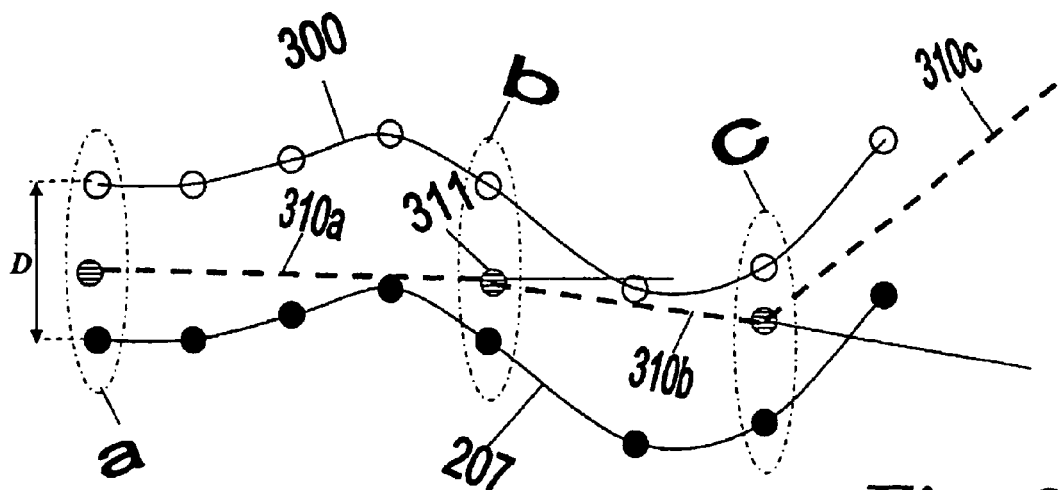
FIG. 3 illustrates a method of data sets compression according to one embodiment of the invention.

The compression starts by defining the maximal deviation (D, shown in FIG. 3) allowed from each point in the line of exposable heights 207. The allowed deviation D (set of points 300 in FIG. 3) is allowed to be introduced only above the line of exposable heights 207, i.e. for each point (207)+D=(300). Thereby, a "sleeve" of tolerable deviation is defined between the two lines, 207 and 300. The compressed data set is obtained from the set of the longest straight lines 310a-c that can be drawn within the sleeve of tolerable deviation. One way to carry out the compression process may be by performing the following steps:

1—Generate a sleeve of tolerable deviation by adding the tolerable deviation D to the altitude of each point in the original un-compressed line of exposable heights;

2—Draw the longest straight line possible (310a) within the sleeve of tolerable deviation starting at the edge of said sleeve;

3—define an end point (311) on said longest line, within said sleeve, at the farthest section where said longest line intersects with one of the lines (207 or 300) of said sleeve, where said end point is preferably located between the nearest pair of points located on the line of exposable heights (207) and on the upper line (300) of said sleeve, before said intersection;

4—draw the next longest line (310b) starting from the end point (311) of the previous line; and 5—repeat steps 2 to 4 until the end said sleeve is reached.

The data processing carried out according to the method of the invention is also unique due to the approach utilized to solve the exposability problem. In the case of an air vehicle, for instance, an altitude should be determined, at which each target can be exposed. The visibility of air vehicles is confined to the limitations angle, and therefore the targets can be exposed only within this range of angles Ø. On the other hand, each of the targets can expose the air vehicle within the same range of angles, but with a 180° angle shift (since the exposability problem is symmetric). Therefore, the exposability problem can be inverted and solved according to the observablity of terrain points (in the view of the targets), and the air vehicle altitude in which the targets are visible to the mission force can be resolved in this way.

The terrain is analyzed from a terrestrial point of view (i.e., targets' sight), but within the air vehicle limitations angle. The directional fans 220 consist of a set of vectors of exposable heights 404. The vertex of each directional fan is the source point 200, and the fan azimuth 401 is preferably the azimuth of the bisector of the fan opening angle, which is preferably opposite in direction to the approach azimuth 223 of the mission force (i.e., 180° angle shift), opening angle φ (403), maximal range $R_{max}$, and angular resolution 402 of θ degrees between each vector of exposable heights 404. The maximal range $R_{max}$ is determined according to the destination terrain, the targets, and mission vehicle/force characteristics (e.g. visibility conditions). The opening angle used to construct the directional fans is determined according to the vehicle limitations angle.

As was previously mentioned, the directional fans 220 includes fundamental data sets according to the method of the invention. In a preferred embodiment each directional fan 220 comprises: the maximal range $R_{max}$; directional fan opening angle φ (403); fan azimuth 401; maximal compression deviation D; height of source point 200 (measured relative to sea level); spatial location of the source point 200 in two-dimensional coordinates plain; vectors of exposable heights 404; and the direction of each vector of exposable heights.

DTMOs:

The digital terrain model obtained after performing the pre-processing steps (100 and 101) results in a Data Base (DB) of directional fans 220 consisting of a compressed vector of heights 404, which includes all the pertinent information required for the planning of the specific mission. The data processing for the mission planning proceeds by introducing queries concerning different mission aspects as shown in step 103 of. FIG. 1A. This is an intermediate step in which a unique DTMO is constructed for each mission aspect. For example, in one preferred embodiment of the invention, the exposability DTMO, communication DTMO (which usually includes a single directional fan), are constructed and then used in a later processing stage 108 in which the MDTMO is constructed.

Each DTMO contains information relevant to a specific mission aspect. Therefore, each query performed requires a lookup process limited only to fetching the desired information, which does not involve any complex computation. In general, each DTMO includes numerous directional fans 220 covering the mission area, where each directional fan is directed in the opposite direction of the mission force/vehicle approach direction, and has an opening angle set according to the vehicle limitations angle.

Figure 5:
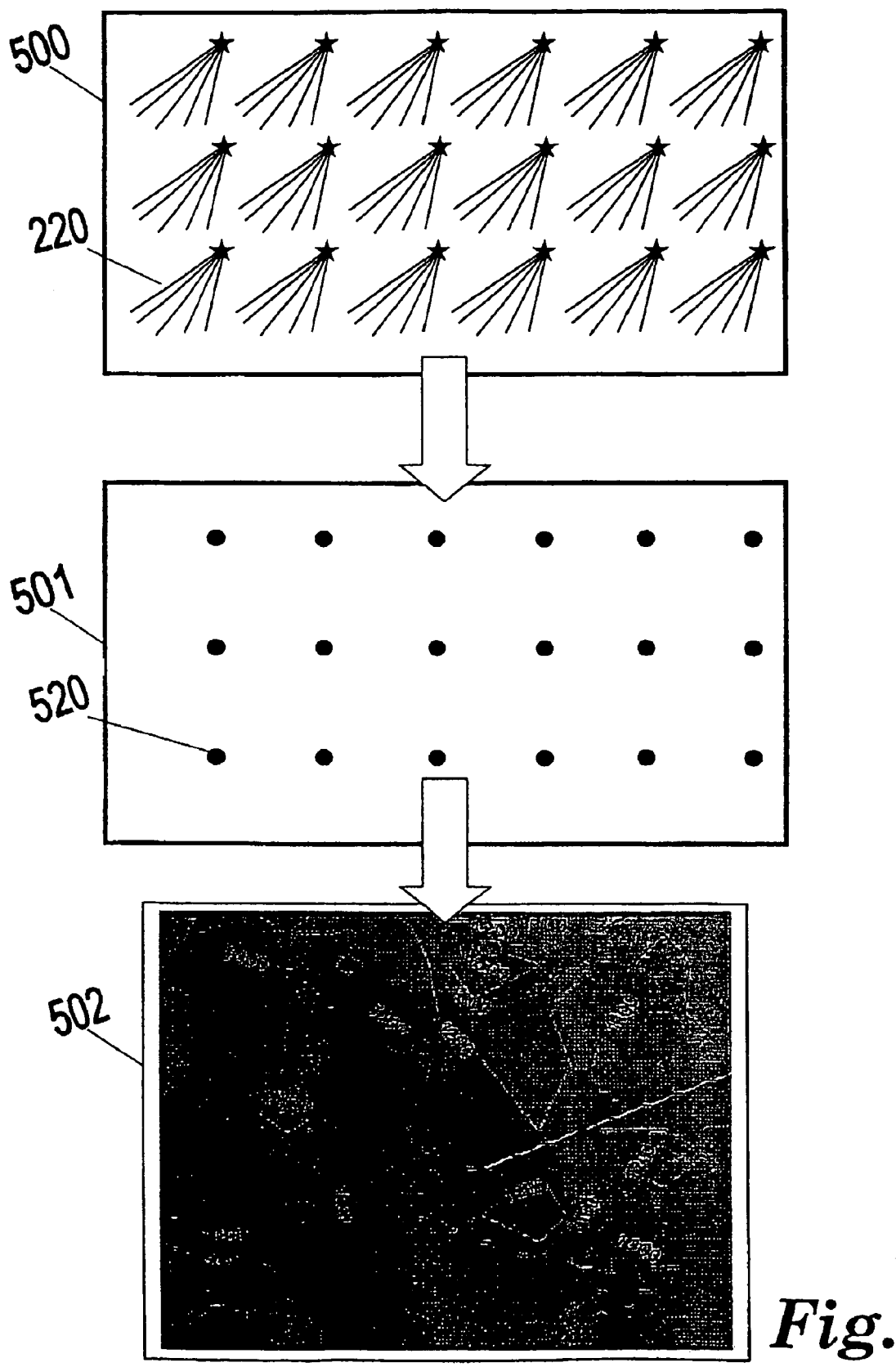
FIG. 5 exemplifies the steps of interrogating a directional fan DB by a query.

An exemplary query process is sketched in FIG. 5. The relevant terrain model of compressed directional fans 500 is interrogated by a query. Each directional fan 220 is looked up and the relevant data 520 is retrieved, obtaining the respective DTMO shown in 501. The query result can be processed and displayed in the form of continuous contour lines in 502, each of which represents points having the same properties e.g., points which determine minimal altitude required for satisfying certain exposability conditions or which determine mission area coverage.

Queries:

A query will typically interrogate the DTMO DB of compressed directional fans for data concerning the altitude and/or distance required to satisfy predetermined conditions. The queries are performed in various stages of uncertainty. More particularly, these stages may be categorized into the following levels of uncertainty:

1—Unknown azimuth of approach: in this case the queries are established utilizing a general azimuth of approach or a range of possible approach azimuths, and the worst case results is therefore used;
2—Known azimuth of approach: in which a general approach path (track) is known, and therefore these queries provides more accurate results;
3—Given specific location: this type of interrogation is typical for "real-time" scenarios, wherein there may be a need to quickly analyze the area in which the mission force/vehicle is located during the mission execution.

It should be noted, that regardless of the level of uncertainty, the limitations angle is used to define the directional fan opening angle to be used for these queries.

Few examples of possible queries are explained here below:
1. exposability DTMO for a given distance—this is a DTMO indicating the minimal altitude required to establish line of sight with the target(s) for a given distance and azimuth of approach of the mission vehicle;
2. communication DTMO—this DTMO indicates the minimal altitude required to establish communication with a given point, in any possible location in the selected terrain;
3. exposability DTMO for a given altitude—this is a DTMO indicating the minimal distance that is required to establish line of sight with the target(s) for a given altitude and azimuth of approach of the mission vehicle; and
4. mission execution DTMO (MDTMO)—the combination between an exposabilty DTMO for a given distance and altitude from ground points in the mission zone, and the communication DTMO, and additional information such as vehicle performance capabilities. Thus this DTMO represents the suitable trajectory required for mission execution in a given distance(s) and azimuth(s)

Off-line Planning Queries

This is a preliminary stage in which usually only mission destination is known and thus the azimuth of approach is not well defined, or that it is known in a general and wide sense. This stage is usually performed well before the mission execution. In the first stages of the off-line mission planning (step 111 in FIG. 1B) the exact approach path is usually not known, and therefore the mission force/vehicle state during the mission execution (azimuths, altitudes, etc.) is not known. In this case the terrain analysis is performed utilizing a rough approximation of the Mission force/vehicle state, and/or ranges of possible values of the same, and of course within the limitations angle. This process is illustrated in step 111 in FIG. 1B. The compressed directional fans data sets (terrain information) 120 are interrogated utilizing said queries which yields DTMOs (DTMO1-DTMO4) which utilize the worst case results.

As the off-line mission planning proceeds, the worst case results obtained for a possible range of approach azimuths are used to define a desired optimal track for the mission force/vehicle. This optimal track is determined according to various aspects. For instance, it may be influenced by the total mission distance and time frames, possible threats, and/or mission force/vehicle performance.

This information is then used to further interrogate the compressed data set 120 with more specific queries. For example, the queries may be used to obtain exposability information over said desired track without indicating a specific mission force/vehicle state. Such interrogation can be used by declaring a desired range from the destination over sections of the track in which the mission force/vehicle is exposed to destination sites. Alternatively, the queries may be used defining a desired duration of time in which the mission force/vehicle is exposed to the destination site.

On-line Planning Queries (Mission Monitoring)

These types of queries are typically performed during the mission execution, and thus involve more accurate information concerning the mission force/vehicle state. More particularly, in many cases this type of queries are performed for a given location and orientation in space of the mission force/vehicle. As exemplified in step 121 of FIG. 1B, the results that are obtained will usually include DTMOs of exact exposable areas, and/or areas in which communication can be established with another point(s) in space. Therefore, the compressed data sets 120 is analyzed by queries utilizing well defined mission force/vehicle state information, according to the actual location and state of the mission force/vehicle. Correspondingly, the DTMOs information obtained in this case is more accurate.

Typically, on-line queries 121 are used for mission re-planning, which may be required for instance during the mission execution in situations in which an alternative mission plan is needed to successfully finalize the mission. Such scenarios are mostly probable due to new information gathered during the mission execution, or due to unexpected developments (e.g., weather conditions). However, such re-planning may also be carried out utilizing the of-line queries, which were previously discussed, according to the level of uncertainty and the re-planning needs.

On/off-line Planning with Different Stages of Uncertainty

Figure 6A:
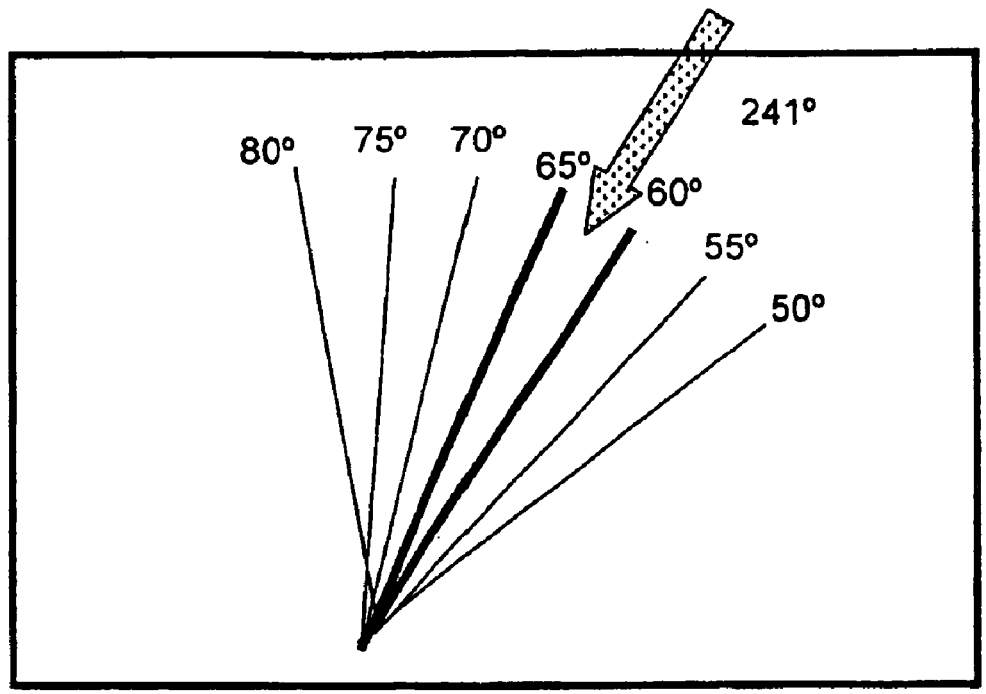
FIGS. 6A-6C exemplifies the defined/undefined azimuth of movement, and track dependent queries.

According to one preferred embodiment of the invention, the direction of approach of the mission vehicle can be defined according to one of the following:

Defined azimuth: to resolve queries having a defined azimuth of approach. In this case two adjacent vectors of exposable heights 404 are interpolated in each directional fan. The two adjacent vectors of exposable heights are the two vectors which have an azimuth in the vicinity of the azimuth that is opposite to the azimuth of approach. For instance, in FIG. 6A, a query is performed for a given azimuth of 241° in which the vectors of exposable heights with azimuths of 60° and 65° are interrogated.

Figure 6B:
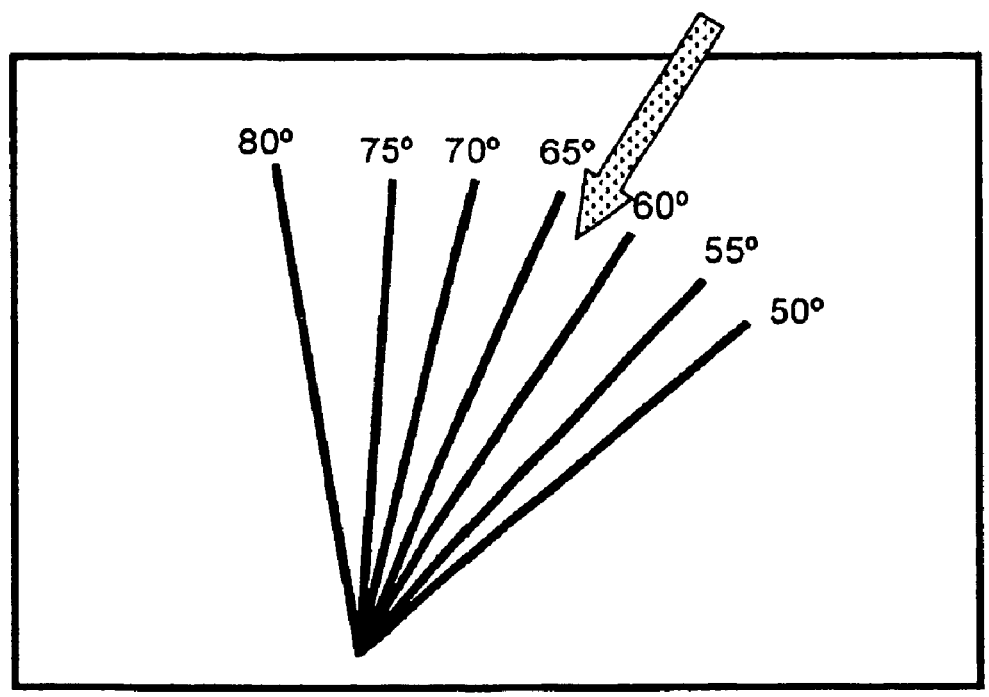

Undefined azimuth: in such queries all the vectors of exposable heights in a directional fan 220 are utilized. Such a case is depicted in FIG. 6B, where for an undefined azimuth a query is performed, and each and every vector (in azimuths 50°, 55°, . . . , 80°) of exposable heights in the directional fan is interrogated, and usually the worst case result from all of the vectors of a fan is chosen.

Figure 6C:
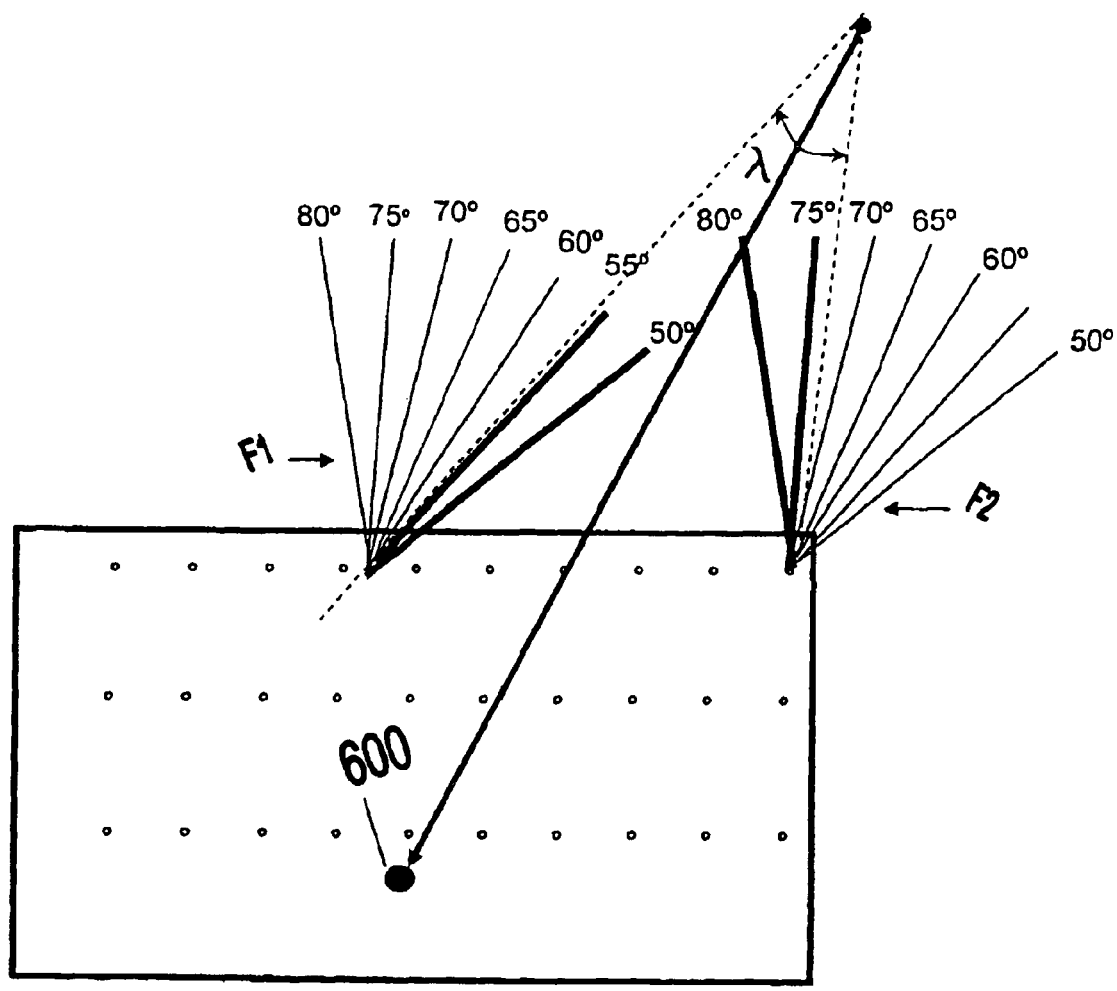

Track dependant: in this case a well defined track is given to the destination 600. Correspondingly, different suitable azimuths are used to interrogate vectors of exposable heights of different directional fans in the terrain model DTMO DB. Thus vectors of exposable heights 404 having different azimuths are selected in each directional fan. This case is exemplified in FIG. 6C. In this case the query performed in each directional fan is carried out only on the vectors of exposable heights 404 having azimuth that falls between the edges of the limitations angle λ. In this example the vectors of exposable height in directional fan F1 that are interrogated are those having azimuths of 50° and 55°, and in directional fan F2 the vectors of exposable height that are interrogated are those having azimuths of 75° and 80°.

Figure 7:
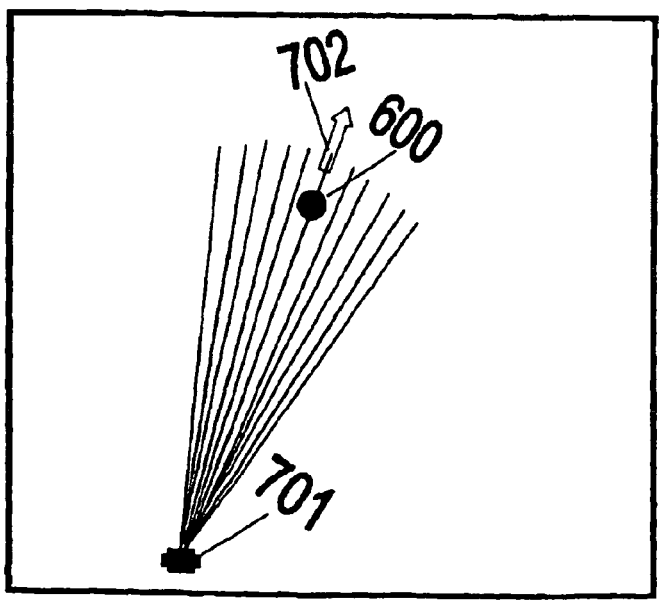
FIG. 7 show the structure of a communication fan.

Communication DTMO:

The communication model is usually constructed from a single directional fan the base of which is located at the mission control center, and its vectors of exposable heights 404 consist of points which are in line of sight with the control center. 701. This terrain model is treated in a similar fashion to extract DTMOs that indicates the minimal altitude in which communication can be established with the mission control center. The directional fan azimuth 702 is computed according to the path between the mission control center 701 and the destination 600, as shown in FIG. 7. It should be noted that the destination 600 may be a single point, as well as a collection of points defining a destined area for the mission assignment.

Exposability DTMO:

The exposability DTMO includes a set of directional fans, each of which corresponds to a terrain point in the DTED of the mission area. These directional fans include all the information required to respond to exposability queries, for a given approach azimuth in the mission area. The exposability DTMO is created by performing the following steps:

1—defining the approach azimuth; and
2—generating exposability fans for each point according to the approach azimuth, and directional fan definitions (angular resolution θ, opening angle φ, etc.).

As will be appreciated by those skilled in the art, the method of the invention may be carried out in different ways. For example, according to one preferred embodiment of the invention instead of constructing directional fans for each point, a DB of 360° fans is constructed, and only the relevant vectors on each fan are used for a given azimuth of approach.

According to another preferred embodiment of the invention the size of the directional fans DB is further reduced by reducing the number of points required for different terrain cells according to the curvature and complexity of the different terrain cells. Thereby, terrain areas which are relatively flat can be modeled by the use of a small set of DTED points, which results in a significant reduction in the size of the DTMO (i.e., less data is required).

The size of the DTMO is even further reduced by utilizing a dynamic determination of the opening angle and angular resolution for each directional fan. In this way, for example, in areas which are relatively flat the angular resolution required may be reduced to further reduce the data of the directional fan.

It should also be noted that the method of the invention provides an efficient DTMO data base that enables query interrogation via a lookup process. Since the information is organized in the form of vectors of exposable height in the directional fans, for each query only the pertinent vectors are extracted from each fan in a lookup process. The data in the DTMO is preferably organized in a polar format (i.e., utilizing polar coordinates), which further simplifies the query lookup process. After the pertinent vectors are extracted from each directional fan, a line of sight is obtained by an interpolation of the vector data, and the results are transformed into a Cartesian coordinate system, as relevant to the assignment.

The above examples and description have of course been provided only for the purpose of illustration, and are not intended to limit the invention in any way. As will be appreciated by the skilled person, the invention can be carried out in a great variety of ways, employing techniques different from those described above, all without exceeding the scope of the invention.

The invention claimed is:

1. Method for determining in real time whether an air or a land vehicle is exposed to at least one selective source point of interest within a terrain, comprising the steps of:

pre-defining a compact size Digital Terrain Model (DTMO) by:
  a) providing a Digital Terrain Elevation Data (DTED);
  b) defining at least one selective source point of interest within said DTED;
  c) for each source point of interest within the DTED, defining a directional fan, said directional fan definition comprises a fan opening angle, a fan azimuth, a maximal range for terrain analysis, and a fan data set having an origin at a corresponding one of said source points;
  d) evenly dividing each fan opening angle into plurality of angular directions according to a fan angular resolution;
  e) for each of said fan angular directions, determining all DTED points along said angular direction which have a line of sight with the corresponding fan source point, and discarding all other DTED points in said angular direction which do not have a line of sight with said fan source point;
  f) for each of said determined DTED points along a same fan angular direction, defining a line of sight starting at the fan source point and:
    if the point is not a peak point, ending at said point;
    if the point is a peak point, ending at a terrain point beyond said point,
    if exists, or at a point of space at said maximal range for the terrain analysis;
    wherein the collection of all said lines of sight along a same direction form a corresponding directional data set of exposable heights;
  g) associating all the data sets of exposable heights of a same fan to a corresponding fan data set, all the separate fan data sets form the said DTMO;
  and in real time performing the following steps:
  A. determining from a known x;y;z location of the vehicle the angular direction from the vehicle to said selective source point of interest, and selecting from the DTMO the fan data set which corresponds to that source point, and from said selected fan data set selecting the directional data set of exposable heights which corresponds to said determined angular direction;
  B. determining from the known x,y,z location of the vehicle the range from the vehicle to said selective source point of interest;
  C. from said selected directional data set of exposable heights and said range from the vehicle to the source point, determining whether the vehicle is above a respective line of sight at that range, and in the affirmative case, concluding that the vehicle is exposed to said source point, otherwise, concluding that the vehicle is not exposed.

2. Method according to claim 1, wherein the collection of all the lines of sights within a fan data set defines an exposability envelope with respect to this fan source point.

3. Method according to claim 1, wherein the angular direction from the vehicle to said selective source point of interest is the approach azimuth of said vehicle to said source point.

4. Method according to claim 1, wherein the fan opening angle is defined based on visibility limitations.

5. Method according to claim 1, wherein the fan angular resolution is determined according to the fan opening angle and the fan maximal range.

6. A method according to claim 1, wherein terrain information is obtained from the directional fans via a lookup process.

7. A method according to claim 6, wherein the terrain information which is obtained further comprises interpolation within an angular angle spanning two or more directional data sets of exposable heights of a same fan data set.

8. Method according to claim 1, wherein the directional fan data set further comprises the DTMO maximal range, the fan opening angle, fan direction, maximal compression deviation, height of the source point, spatial location of the source point, and the respective lines of sight to those points having a line of sight to the source point.

9. Method according to claim 1, wherein the maximal range for terrain analysis is infinity.

10. Method according to claim 1, wherein the fan opening angle of at least one fan is 360°.

11. Method according to claim 1, wherein the DTMO is a communication DTMO which comprises a single fan and a corresponding fan data set, and wherein the fan source point is a mission control center of the vehicle to which exposability is checked, to determine whether communication is possible.

12. Method according to claim 1, for further finding, given a range of a vehicle to a selective source point, the bordering height of exposability to that source point at each direction to the source point.

13. Method according to claim 1, further comprising compression of the DTMO data by applying a data transformation.

14. Method according to claim 13, wherein the data transformation comprises compression of the data relating to the lines of sight included within each directional data set of exposable heights, by merging plurality of lines of sights which fall within a predefined range of elevation angle to a single line of sight.

15. Method for determining in real time whether an air or a land vehicle is exposed to a selected one of selective source points of interest within a terrain, comprising the steps of: providing a Digital Terrain Model (DTMO) by:
  a) providing Digital Terrain Elevation Data (DTED);
  b) selecting one of said selective source points of interest within said DTED as a selected source point;
  c) defining a directional fan, said directional fan comprising a fan opening angle, a fan azimuth, a maximal range for terrain analysis, and a fan data set having an origin at said selected source point;
  d) evenly dividing said fan opening angle into plurality of fan angular directions according to a fan angular resolution;
  e) respectively determining for said fan angular directions all points within said DTED along said fan angular directions that have lines of sight with said selected source point, and discarding all other points within said DTED;
  f) ending for each of said determined points along each of said fan angular directions
    if said determined points are not peak points, at said determined points, or;
    if said determined points are peak points, at terrain points beyond said determined points or at points at said maximal range for terrain analysis,
    wherein collections of said endings along each of said fan angular directions form corresponding directional data sets of exposable heights; and
  g) associating all said directional data sets of exposable heights of said directional fan into a corresponding fan data set forming said DTMO; and
  in real time performing the following steps:
    A. determining from an x;y;z location of said vehicle an angular direction from said vehicle to said selected source point;
    B. determining from said x;y;z location of said vehicle a range from said vehicle to said selected source point; and
    C. determining from said fan data set and said range whether said vehicle is above said lines of sight and, in the affirmative case, concluding that the vehicle is exposed to said selected source point.

* * * * *